United States Patent [19]

Sherman

[11] 4,267,290

[45] May 12, 1981

[54] METHOD OF BINDING A PHENOL-BASED THERMOPLASTIC RESIN TO A CURED AND MOLDED-THERMOSET PHENOLIC PLASTIC

[76] Inventor: William F. Sherman, 2 Burtenmar Cir., Paxton, Mass. 01612

[21] Appl. No.: 893,381

[22] Filed: Apr. 4, 1978

Related U.S. Application Data

[60] Division of Ser. No. 632,026, Nov. 14, 1975, Pat. No. 4,088,729, which is a continuation of Ser. No. 450,261, Mar. 11, 1974, abandoned, which is a division of Ser. No. 108,789, Jan. 22, 1971, Pat. No. 3,800,483.

[51] Int. Cl.$^3$ ............................................. C08L 61/10
[52] U.S. Cl. .................................... 525/465; 427/316; 525/390; 525/480; 525/501
[58] Field of Search ................ 260/842; 525/465, 390, 525/480, 501

[56] References Cited

U.S. PATENT DOCUMENTS

| | | | |
|---|---|---|---|
| 2,950,266 | 8/1960 | Goldblum | 260/842 |
| 3,294,862 | 12/1966 | Prochaska | 260/842 |
| 4,024,094 | 5/1977 | Kurata et al. | 260/842 |

Primary Examiner—Wilbert J. Briggs, Sr.
Attorney, Agent, or Firm—Sughrue, Rothwell, Mion, Zinn and Macpeak

[57] ABSTRACT

A method of making grinding wheel mounts by molding a central hub onto a thermoset plastic abrasive disc is provided. An aromatic polycarbonate thermoplastic resin is molded to form a hub on a cured thermoset plastic abrasive disc. It is believed that the polycarbonate forms both a mechanical and chemical bond with the thermoset plastic to provide an efficient method of producing grinding wheels.

10 Claims, 4 Drawing Figures

METHOD OF BINDING A PHENOL-BASED THERMOPLASTIC RESIN TO A CURED AND MOLDED-THERMOSET PHENOLIC PLASTIC

This is a division of application Ser. No. 632,026 filed Nov. 14, 1975, now U.S. Pat. No. 4,088,729, in turn a continuation of Ser. No. 450,261, filed Mar. 11, 1974, abandoned, and in turn a divisional of Ser. No. 108,789 filed Jan. 22, 1971 now U.S. Pat. No. 3,800,483.

BACKGROUND OF THE INVENTION

1. Field of the Invention

This invention relates to improvements in the manufacturing of abrasive grinding wheels.

2. Prior Art

The concept of utilizing a revolving surface for frictional or impact removing of rough spots on various items such as weldments, concrete surfaces, machine work, and the like is well known. The U.S. Pat. No. 3,081,584 granted Mar. 19, 1963 to Robert A. Bullard, discloses a conventional abrasive wheel presently in commercial use. This abrasive wheel consists basically of a central base member to provide connection to a portable hand grinder or other machine for supplying the motive force and a disc member attached to the central base member. The disc member has usually assumed the form of a screen impregnated with an abrasive and a bonding agent.

The abrasive wheel of the Bullard patent utilizes a central mounting member with a considerable flange for providing sufficient surface to permit a fastening of the abrasive disc onto the central member by means of an epoxy resin cement. To further insure a sufficient bonding between the central mounting member and the abrasive disc, the tubular portion of the central mounting member that extends through the abrasive disc is generally "ball swaged" to provide a counter sunk portion of the tubular projection against the lower surface of the abrasive disc. Thus, the manufacturing process of the presently accepted abrasive wheel requires a two-step process for joining an abrasive disc to a metallic central mounting member. This process includes the step of adhering by an epoxy resin the flange of the central mounting member to the disc and further the step of mechanically deforming the metallic central member by countersinking or "ball swaging" the central mounting member onto the lower surface of the abrasive disc. Generally the epoxy material must be cured before the abrasive wheel is capable of use.

Another form of an abrasive wheel used for "snagging" provides a replaceable disc having a central hole which is mounted by a coaction of washers or clamps on either side of the disc onto a grinder machine. Vibrational problems in loosening the washers and clamps have been a problem in utilizing this form of abrasive wheel. Likewise a considerable amount of time and effort must be utilized by the operator in mounting the abrasive wheel on the grinder or changing an abrasive disc.

SUMMARY OF THE INVENTION

The present invention is designed to provide a method or process of manufacturing abrasive wheels in a highly economical and efficient manner. This is accomplished by molding a strong thermoplastic mounting hub directly onto the abrasive wheel. By appropriately designing the abrasive wheel the thermoplastic hub can be molded to form both a chemical and mechanical bond in a single step that removes any necessity of an elaborate finishing process which would include a prolonged curing process of an epoxy adhesive material. The present invention also is directed to a method of bonding a phenol-based thermoplastic resin to a cured and molded thermoset phenolic plastic as will be hereinafter described.

BRIEF DESCRIPTION OF THE DRAWINGS

The best mode contemplated of carrying forth the process of the present invention will be described in detail below in connection with the accompanying drawings in which.

DESCRIPTION OF THE PREFERRED EMBODIMENT

Figure 1:
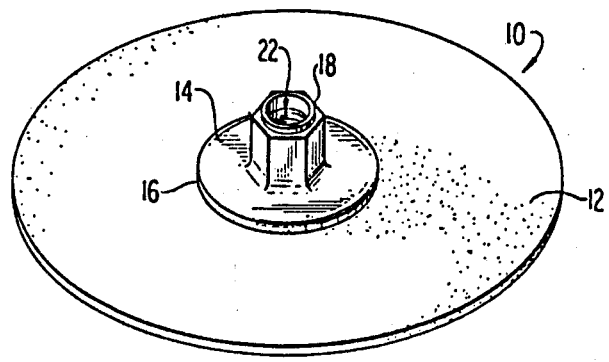
FIG. 1 is a perspective view of an abrasive wheel produced according to the process of the present invention.

The process of the present invention is generally accomplished by inserting a specially designed abrasive wheel, which may be preheated, into the stationary mold half of one side of a conventional plastic mold, and inserting a polished chrome plated hardened steel insert through the abrasive wheel disc by closing the die to form the mold cavity. A molding machine forces a thermoplastic into the mold and more specifically, in the preferred process the thermoplastic material is of that family known as polycarbonates sold under the trademark MERLON, which is a thermoplastic resin that is manufactured by the process of either, phosgenation of dihydric phenols, usually bisphenol-A; or ester exchange between diaryl carbonates and dihydric phenols, usually between diphenyl carbonate and bisphenol-A; or interfacial polycondensation, generally accomplished with a chlorinated aliphatic solvent, aqueous sodium hydroxide, bisphenol-A and phosgene. The present process generally requires the polycarbonate polymer produced by any one of the above methods to be heated to a temperature range of approximately 400° F. to 600° F. so as to be in a softened state. The general base structure of the polycarbonate polymer is as follows:

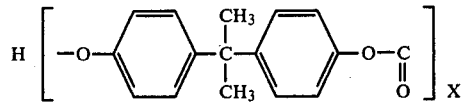

where X=50–400 units

U.S. Pat. Nos. 3,030,331 and 2,999,845 granted to E. P. Goldberg can be referred to for greater detail on polycarbonate polymers.

This polycarbonate resin can be considered an ester of carbonic acid and bisphenol A and generally has the following physical characteristics:

| | |
|---|---|
| Compression ratio | 1.74–5.5 |
| Specific gravity (density) | 1.2 |
| Specific volume, cu. in./lb. | 23.0 |

-continued

| | |
|---|---|
| Softening Range °F. | 400-600 |
| Tensile strength, p.s.i. | 8,000-9,500 |
| Elongation, % | 100.0-130.0 |
| Flexural yield strength, p.s.i. | 13,500 |
| Impact strength, ft. lb./in. of notch (⅛ × ½ in. notched bar), Izod test | 12.0-17.5 (⅛ × ⅛ in. bar) |
| Compressive strength, p.s.i. | 12,500 |

Some possible injection molding parameters, for the aromatic polycarbonate are as follows:

1. Cylinder, or stock temperatures of the material,—400° F. to 600° F. Most parts can be molded in the range of 500° F. to 580° F., but as part configuration, and shot size compared to the capacity of the machine will vary, it is sometimes necessary to use the lower or the higher temperatures.

2. Mold Temperature—150° F. to 250° F., some molds do not have to be heated or cooled, but the average ideal mold temperature for most polycarbonate parts is, 180° F.

3. Injection Pressure—5,000 p.s.i. to 30,000 p.s.i. The average is usually from three quarters, to the full amount that the machine can supply, 20,000 p.s.i. at the orifice of the nozzle gives the best polycarbonate parts, as a rule.

4. Cycle. This will depend on the part to be molded, however; parts are governed by their thickness, and it is necessary to inject the material rapidly for most parts, but for very thick parts, slower injection is required, thus, slowing the overall cycle. Parts of good quality, ¼" thick, have been molded in twenty seconds. Because of its high heat distortion point, polycarbonate can be molded, using shorter cycles than most other plastics, as it cures in the mold, or sets up, quite rapidly.

Other thermoplastic resins that are capable of being used in place of polycarbonate are polypropylenes, both homopolymer and copolymer and the A.B.S. copolymer or terpolymer family of plastic (a combination of acrylonitrile, butadiene and styrene). The high impact strength and high heat distortion characteristics make them suitable for the present invention.

During the process of one form of the invention a compatibility between the particular thermoset plastic utilized in the abrasive disc of this invention has been found with the aromatic polycarbonate thermoplastic resin of the central hub member. In fact, it is believed that the thermoset plastic forms a chemical bond with the thermoplastic resin to increase the strength of the connection between the hub and the abrasive disc. Generally, the abrasive disc comprises a base of a fiberglass web or mesh containing abrasive powder of a well known type such as aluminum oxide and a phenolic resin to serve as a bonding agent.

Turning now to the thermoset plastic material applicable to the present invention, it has been found that phenol-formaldehyde resins prepared by the one-stage or two-stage method are extremely suitable for use in the present invention.

In phenol-formaldehyde resins prepared by the "one-stage" method, the formaldehyde in a concentration greater than one mol per mol of phenol is used with an alkaline catalyst, such as caustic soda in order to produce an ammonia-free resin.

In the "two-stage" method, an excessive amount of phenol together with formaldehyde and an acid catalyst, such as hydrochloric or sulfuric acid, are reacted to form what is known as a novalak. In this method, additional formaldehyde is required in order to complete the final polymerization, and this is usually attained in the form of hexamethylenetetramine (commonly known as hexa).

Between the two types of phenol-formaldehyde resins, those produced by the two-stage method are preferred for use in this invention, since they are known to have a far longer shelf life than those prepared by the one-stage method.

Illustrative of these phenol-formaldehyde resins and specifically the novalak resins, are the so-called Durez Resins produced by the Hooker Chemical Company.

These resins have a mean molecular weight of about 500 and an average molecular weight ranging from 450 to 550.

While not wishing to be limited to any particular theory, it is believed that the resulting strength characteristics of the grinding wheel of the present invention are attained through the cross-bonding between the thermoset plastic and thermoplastic polycarbonate during the molding process. In addition, the possibility of a Vander Wal bonding resulting from the interaction of the molecular poles of the polymers appears to be a distinct possibility.

At this juncture, it should be mentioned that the phenolic resins contemplated for use herein are not limited in number. That is, any phenol-formaldehyde resin prepared in the aforementioned manner and from the aforementioned components will suffice, providing, however, it does not detract from the goals of the present invention.

However, the salient feature here resides in the fact that the thermoplastic component (polycarbonate) and the thermoset component (phenol-formaldehyde resin) when united, form an extremely strong bond. This is totally unexpected in view of the known properties between these two types of materials. Hence, the thermoset plastic (herein defined as one which is already cured and being in the molded state) would not be expected to create the strong chemical and mechanical bond as achieved herein.

As an additional feature of the invention it would be possible to provide color coding in the plastics so that the color of the hub of a particular abrasive wheel would signify a particular size or type of disc thus removing any necessity to provide other indicia that would, for example, state a specific safety limit for the use of the abrasive wheel.

Referring to FIG. 1, the end product of the manufacturing process can be seen. The grinding wheel assembly 10 comprises basically an abrasive disc 12 and a hub 14.

The abrasive disc generally comprises a number of layers of fiberglass mesh impregnated with a mixture of an abrasive, such as aluminum oxide or silicon carbide or some other appropriate abrasive with a bonding agent which in the preferred embodiment is a resinoid organic bonding agent. Other bonding agents could include vitrified, rubber, shellac or silicate. The hub member 14 in the preferred embodiment is an aromatic polycarbonate molded into the shape of a hexagonical nut 18. The base of the hub 14 includes a flange 16 which is connected with the hexagonical nut portion 18 by a generous radius 20 to remove any stress associated with a "notched effect."

Figure 2:
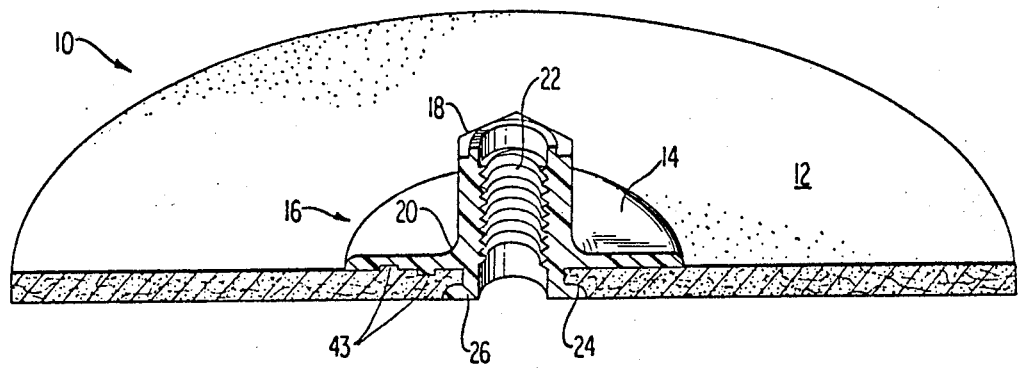
FIG. 2 is a perspective cross-sectional view of the abrasive wheel of FIG. 1.

As can be seen in FIG. 2, the hexagonical nut 18 has a threaded aperture 22 and generally the top portion of the hexagonical nut 18 is appropriately countersunk. The lower surface of the abrasive disc 12 has a circular portion 24 removed to form a cavity. This permits the heat softened aromatic polycarbonate to form a round ring of plastic 26 to provide a mechanical bond between the hub 14 and the abrasive disc 12. Just as in the top portion of the hub 14 the lower portion is generally countersunk and after the finishing operation, the hub 14 does not protrude below the lower surface of the abrasive disc 12. Utilizing an aromatic polycarbonate having a tensile strength in the range of from 8000 to 9500 psi, the preferred grinding wheel assembly will have a hub that is bonded to the abrasive disc 12 and which will have a strength stronger than the abrasive disc 12 itself. This form of polycarbonate material generally has an impact strength with values nearing that of most metals per unit weight.

Figure 3:
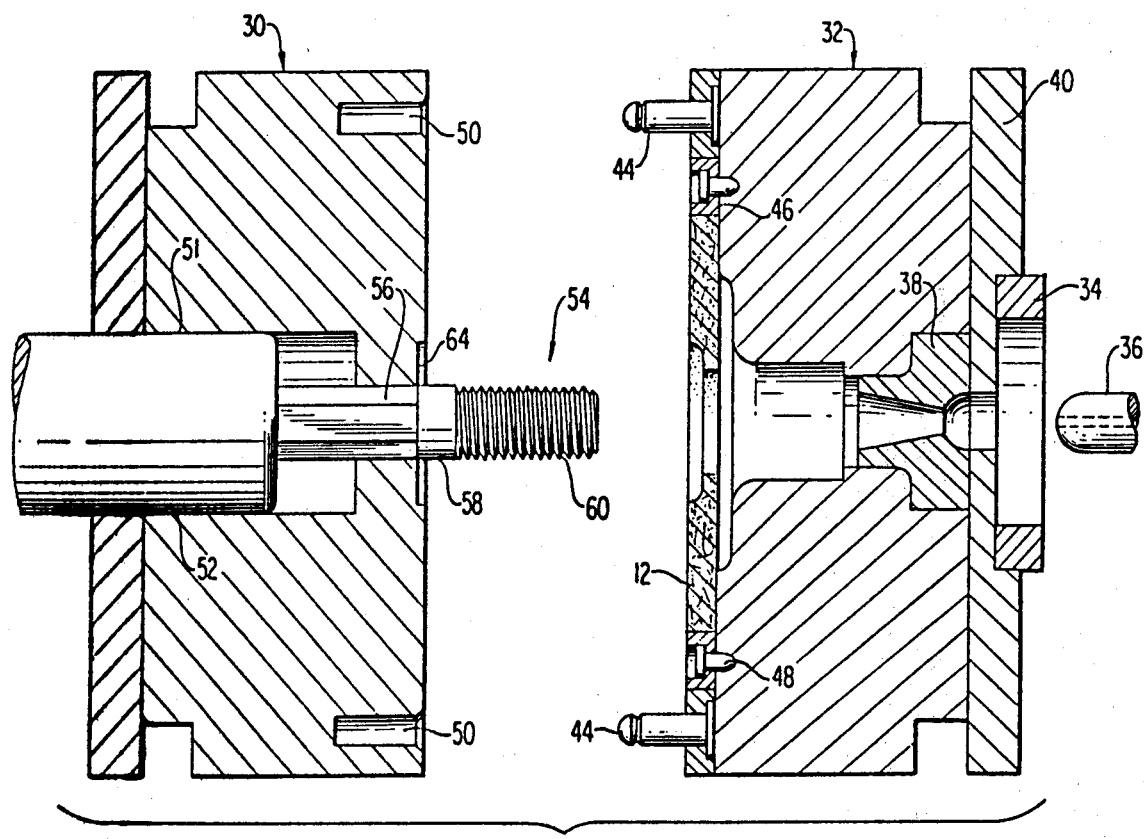
FIG. 3 is a sectional view of the molding equipment utilized in the inventive process.
Figure 4:
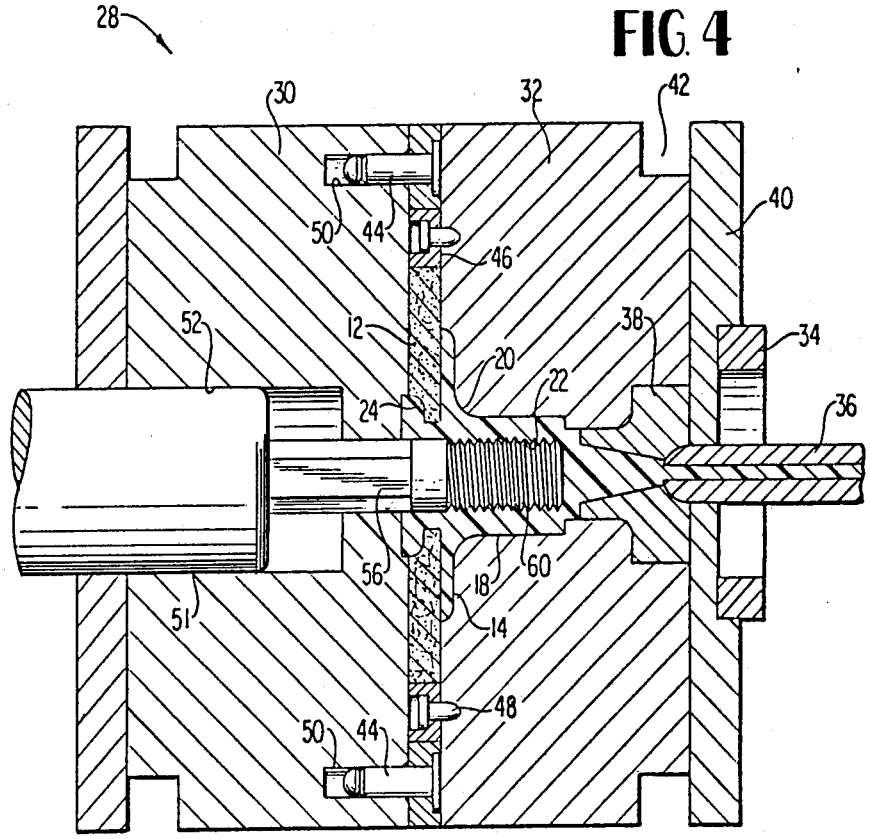
FIG. 4 is a cross-sectional view of the molding apparatus of FIG. 3 during operation.

Referring to FIGS. 3 and 4, the die assembly 28 comprising a movable mold half 30 and a stationary mold half 32 can be seen. On the back of the stationary mold half 32 is a locating ring 34 used to align the mold into the molding machine. The nozzle 36 of the molding machine passes between the locating ring and seats against the sprue bushing 38. A back plate 40 supports the locating ring 34 and provides a slot 42 with the stationary mold half 32. The slot 42 accommodates the dogs or clamps that are used to fasten the mold to the machine platen. Locating pins 44 extend from the surface of the stationary mold half 32. An alignment plate 46 is appropriately located with alignment dowels 48 to position the abrasive disc 12 in the die assembly. The movable mold half 30 has recesses which form female mates 50 for the locating pins 44 of the stationary mold half 32. A central cavity 52 permits the movable half of the mold 30 upon opening, to move back, allowing the ejector pin 51 to make contact with the end of the insert 54, thus pushing the entire molding free from the movable half of the mold. The insert 54 is preferably made of hard machine steel, chrome plated for both wear resistance and for easy removal from the molded part, has a hexagonical base 56, for positioning in the movable mold half 30. The central portion 58, of the insert 54, is round, and terminates in a threaded portion 60. A depression or cavity surrounds the insert 54 on the face of the movable mold half 30. This undercut depression 64 serves two purposes. It prevents the hot thermoplastic from flashing over the bottom surface of the abrasive disc 12 and it further serves as a sprue puller, that is, it has enough undercut to hold the molded assembly to the face of the movable mold half until the ejector pin 51 contacts the insert 54 to loosen the mold from the die. It is possible that the area may require a slight machine dressing with an end mill in a drill press after molding. The threaded portion of the insert 54 is preferably designed with a rounded crown so that the roots of the thread left in the hub 14 have a sufficient radius to prevent any notch effect or stress risers.

The process of manufacturing the grinding wheel assembly 10 comprises placing the abrasive disc 12 in a stationary mold half 32 of the die assembly 28. Preferably the abrasive disc is preheated to a temperature approximately between 150° F. to 200° F. before the thermoplastic injection step. The movable mold half 30 with the aid of the locating pins 44 and female mates 50 is moved into position so that the insert 54 is in place within the hub cavity of the stationary mold half 32. It is extremely important that the insert 54 be located perpendicular to the plane of the abrasive disc 12 since the abrasive wheel will be utilized at a high rpm. In one preferred embodiment the die assembly 28 can be heated to a temperature between 150° F. to 200° F. and the abrasive disc 12 can likewise either be preheated or brought up to this temperature in the mold. The cylinder of the molding machine will be heated in the range of 450° F. to 600° F. This temperature range will soften the polycarbonate. An injection pressure which will be approximately 20,000 psi at the orifice of the nozzle can be utilized to push the plunger or ram of the injection molding machine forcing the softened polycarbonate through the nozzle 36 and the sprue bushing 38 into the cavity that forms the hub 14. The softened aromatic polycarbonate flows around the threaded insert 54 that creates the threaded aperture 22 and finally through the aperture of the abrasive disc 12 into the circular portion 24 on the bottom side of the abrasive disc 12. The pressure of the polycarbonate around the abrasive disc 12 is approximately 1000 to 1200 psi. In a manner of a few seconds the aromatic polycarbonate has hardened enough to permit the timer controlled plunger of the molding machine to return to its back position and receive another measured amount of aromatic polycarbonate into the heating cylinder. After a few more seconds the mold will open and the entire grinding wheel assembly will be stuck to the movable mold half 30 until the ejector pin 51 contacts the insert 54 to remove the grinding wheel 10 from the die assembly 28. The die assembly 28 is then reloaded with another abrasive wheel 12 and another insert 54 with the cycle being repeated. The insert 54 is removed from the grinding wheel assembly 10 and any sprue is cut off. Generally an end mill in a drill press will be required to dress the finished part and then it would be ready for hot stamping or painting if desired. The entire operation is performed in approximately 30 seconds. It is obvious that a die assembly can consist of a number of cavities and appropriate insert pins 54 so that several grinding wheel assemblies 10 can be manufactured at the same time. The aromatic polycarbonate will generally permit the insert 54 to be hand screwed out of the hub 14 while the aromatic polycarbonate is still in a heated condition. It is possible to modify the movable mold half 30 to permit an automatic revolving of the insert 54 before or after it has been contacted by the ejector pin 51 for the purpose of removing the insert 54 from the grinding wheel.

It is believed that the use of an aromatic polycarbonate permits not only a mechanical bonding to the abrasive disc 12 but also permits a chemical bond with the thermoset phenolic plastic which is utilized as the bonding agent in the abrasive disc 12. The combination of both the mechanical bond and the chemical bond in a single operation provides a highly efficient and durable grinding wheel assembly not previously available to industry.

I claim:

1. A new material comprised of a thermoplastic resin selected from the group consisting of phenol-containing thermoplastic resins and a cured and molded thermoset phenol-formaldehyde resin bonded to each other through cross-linking chemical bonds formed after the curing of said thermoset.

2. The material of claim 1, wherein said thermoplastic resin is a phenol-based polycarbonate.

3. The material of claim 2 wherein said polycarbonate has the following formula:

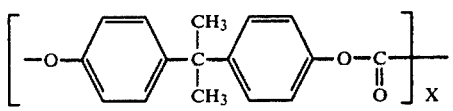

and X is an integer of 50 to 400.

4. The material of claim 2 wherein the polycarbonate is an ester of carbonic acid and bis-phenol A.

5. The material of claim 2, wherein the phenol-formaldehyde resin is a one-stage resin.

6. The material of claim 2 wherein the phenol-formaldehyde resin is a two-stage resin.

7. The material of claim 6, wherein the molecular weight of said phenol-formaldehyde resin ranges from 450 to 550.

8. The material of claim 1 wherein said cross-linking chemical bonds are formed by heating said thermoplastic resin to a temperature of about 450° F. to 550° F. and heating said thermoset to a temperature between a 150° F. and 200° F. and then bringing said thermoplastic and said thermoset into contact with one another.

9. The material of claim 8 wherein said thermoplastic resin and said thermoset are pressurized against each other after said preheating in a pressure range between 1000 and 1200 psi to form said chemical cross-linking bonds.

10. The chemical area of bonding formed between the thermoplastic resin and the thermoset plastic in the new material of claim 1.

* * * * *